United States Patent
Ose

[15] 3,676,548
[45] July 11, 1972

[54] METHOD OF VACCINATING SWINE AGAINST JOWL ABSCESS DISEASE

[72] Inventor: Earl E. Ose, Indianapolis, Ind.

[73] Assignee: Eli Lilly and Company, Indianapolis, Ind.

[22] Filed: Sept. 18, 1970

[21] Appl. No.: 73,615

[52] U.S. Cl. ..................................................424/92
[51] Int. Cl. ........................................C12k 5/00
[58] Field of Search.....................................424/92

[56] References Cited

UNITED STATES PATENTS 3,529,056  9/1970  Engelbrecht..........................424/92

OTHER PUBLICATIONS

Shuman, R. D. et al., Cornell Vet. 57:250–268 " Swine Abscesses Caused by Lancefield's Group E Streptococci. II. Experimental Application of Concentrated Culture Filtrate Antigens for Their Detection." (1967)

Shuman, R. D. et al., Cornell Vet. 55:523–534 (1965) " Sensitization by Erysipelothrix Rhusiopathiae (Insidiosa) with Relation to Arthritis in Pigs. V. Pretreatment with Live Cells and Challenge with Homologous, Heterologous, or Isologous Live Cells"

Sampson, G. R. et al., J. Am. Vet. Med. Ass. 147:484–489 (1965) " Clinical Appraisal of an Avirulent Oral Erysipelas Vaccine"

*Primary Examiner*—Shep K. Rose
*Attorney*—Everet F. Smith and Leroy Whitaker

[57] ABSTRACT

Jowl abscess disease of swine is controlled by the addition of a live attenuated streptococcus group E vaccine to the drinking water of the swine. This vaccine may be combined with other orally-active vaccines effective against diseases of swine.

2 Claims, No Drawings

METHOD OF VACCINATING SWINE AGAINST JOWL ABSCESS DISEASE

BACKGROUND OF THE INVENTION

One major cause of condemnation of parts of hogs which have been slaughtered for meat use is abscesses of the lymph nodes of the neck and jowls. According to Collier, Abscesses of Swine, J.A.V.M.A., 146, 344-347 (1965) as many as 5.7 percent of all slaughtered swine carcasses were affected with abscesses in 1963. The economic loss was estimated to be $11,500,000, of which 70 percent was due to abscesses of the neck and jowl. It was reported that most abscesses of the neck and jowl are due to beta-hemolytic streptococcal lymphadenitis caused by a streptococcus of Lancefield's group E Collier has prOposed the name Streptococcus Suis. Collier reported that continuous feeding of chlortetra-cycline at a rate of 50 grams per ton of feed is an effective treatment, but is quite expensive and may lead to the development of drug resistant bacteria.

Collier produced abscesses of the neck and jowl of swine by inoculation with a culture of group E streptococcus isolated from exudates of cervical abscesses of swine. Healthy swine were inoculated by mixing this culture in their feed. Within about two days after inoculation the animals consumed less feed than normal, and after a week small abscesses approximately 1 mm. in size appeared in the cervical lymph nodes. With three weeks the abscesses had grown to 5 cm. Each abscess was encapsulated in dense fibrous tissue. By the eighth week after inoculation some of the abscesses had burst through the covering skin and had begun to drain and exudate which contained the same bacteriological strain with which the swine had been inoculated. The course of the disease as experimentally induced was in all respects indistinguishable from the abscess disease as it occurs in nature on the farm.

In Conner, G. H. et al., "Evaluation of Bacterin for Control of Swine Abscesses," J.A.V.M.A., 147, 479-483 (1965), two types of bacterin were reported to have been successfully used in the control of swine abscesses. One such bacterin was comprised of alpha- and beta-hemolytic streptococci and beta-hemolytic staphylococci isolated from pigs. The other was a commercial bovine bacterin product. Sows from herds which were known to be infected with abscesses were inoculated with each type. The rate of survival until weaning age was consistently higher among the piglets of the inoculated sows as compared to piglets of uninoculated sows. Piglets of inoculated sows also weighed more at weaning age than did the piglets of uninoculated sows. However, this method of treatment for abscesses has not proved to be economically successful in use in the field.

An effective vaccine for use against abscesses in swine has been produced from a strain of group E streptococcus derived from abscesses of infected swine and identified as ATCC No. 21223. The organism has been attenuated by multiple passages in a medium containing acriflavin until it is avirulent. This vaccine has the major disadvantage that it must be applied directly to the tonsils of the pig when the animal is at least ten weeks of age and therefore weighs approximately 40 pounds. Successful treatment requires holding the pig's mouth open and allowing an effective dose to drip very slowly on the pig's tonsils. This method of treatment not only taxes the strength of the farmer, but also results in undue stress on the pigs which may interrupt their growth and increase their susceptibility to disease.

Summary

I have now discovered an improved method of vaccinating swine against jowl abscess disease which comprises adding to their drinking water a vaccine of a live attenuated group E streptococcus isolated from abscesses of infected swine, the amount of vaccine employed being such as to administer an average dose of $10^8$ to $10^{12}$ viable cells per pig. The addition of the vaccine to the drinking water of the animals eliminates the handling and stress inherent in the present method of vaccination.

DESCRIPTION OF THE PREFERRED EMBODIMENT

It is well known that jowl abscess disease of swine is caused by a number of group E streptococci. Group E comprises many strains of streptococci, most of which are found in swine, but not all of which cause jowl abscess disease. In fact, the various strains of group E have been shown to fall into 11 different serological types. A serological type is defined as a group of strains which produce the same antigens. Any strain in a given serological type will serve, when attenuated, as a vaccine against all organisms in that type.

All streptococci which cause jowl abscess disease of swine have been shown to be in the same serological type. Therefore, any group E streptococcus isolated from a jowl abscess of an infected pig will, when attenuated, serve as a vaccine to protect a properly inoculated pig against all strains of group E streptococcus which cause jowl abscess disease. A culture of the infecting organism may be obtained from the exudate of an abscess or from the contents of the abscess itself. One such isolated organism is identified as ATCC 21223.

In order to use the organism for vaccination against swine jowl abscesses, the full strength organism must be attenuated. One means of attenuation is taught in Netherlands Pat. No. 68,10752 (U.S. Pat. No. 3,529,056, granted Sept. 15, 1970 as follows. A culture medium is prepared from horsemeat bouillon, phosphate buffers, neopeptone, dextrose, sodium chloride, and deionized water. The pH is adjusted to approximately neutral and the mixture sterilized. After cooling, 10 percent of sterile horse serum is added to the medium. Then the medium is inoculated with the active organism which has been isolated from an infected pig. One ppm. of acriflavin is added to the medium in order to retard the growth of the organism, but not kill it. The organism is cultured through many successive passes with the acriflavin content of the media gradually increasing until 10 to 20 ppm. is present at the end of the attenuation process. At the end of these successive passes the organism is so weakened that it can be used as a vaccinating organism without causing the disease.

The above-described method is only one of the many methods of attenuating microbiological cultures which are used in the art. For example, the culture of group E streptococcus can also be attenuated by exposing a group of cultures to different concentrations of nitrosoguanidine. The cultures, after a period of growth, are plated onto agar and any culture in which most of the microorganisms have been killed is tested for its virulence and ability to vaccinate against jowl abscess disease. This is a single step process not requiring successive passages such as are used in the process of the Netherlands patent. In another one-step method, a group of cultures of group E streptococcus can be exposed to ultraviolet light for various periods of time. Again, the culture in which most, but not all, of the organisms have been killed is examined for its degree of virulence and its ability to vaccinate.

There are many other agents, both chemical and physical, which are known in the art to be useful in the attenuation of microbiological cultures. For example, nitrogen mustard, x-rays, peroxide, manganese chloride, a wide array of carcinogenic substances, nitrous acid, hydroxylamine, and alkylating agents can all be used in the attenuation of microbiological cultures. The method which is used for the attenuation of a given organism to an avirulent form is not critical. Any suitable means of attenuation can be adapted to the organism to be used in the method of my invention.

The medium which is described above in the Netherlands patent is not critical. Other media which will serve as a growth media for cultures of streptococcus bacteria can be used for the growth and the attenuation of the microorganism which becomes the jowl abscess vaccine of this invention. After the original culture has been attenuated, by whatever means should be chosen, the attenuated strain is then grown in order to provide a large amount of active but attenuated microorganisms for use as vaccine.

Portions of the attenuated strain are removed from the attenuating culture and placed on media in which growth will occur. For example, a medium can be made up which forms a gel upon cooling. This medium can be plated inside growth bottles by methods which are conventional in the microbiological culture art. The attenuated strain can then be inoculated onto the growth medium. The culture might be allowed to grow at 37° C. for a period of several days. At the end of that time, the medium with its adhering microorganism cultures is removed from the growth jar or bottle. The final mixture containinG the microorganism is usually lyophilized or freeze-dried, in order to prepare it in the final form for use.

The lyophilized culture is typically packaged in rubber-stoppered vials. Each vial contains a known number of cells of the attenuated strain of streptococcus. When the vaccine is to be used, a vial is opened and reconstituted to a known and standardized volume. For example, in one successful experiment with this invention, 500 ml. of vaccine containing $10^9$ viable cells per ml. was used to vaccinate ten pigs.

A range of doses of vaccine may be used in the method of my invention. The preferred dosage range, measured in the manner usual in titering vaccines, is $10^8$ to $10^{12}$ viable cells per pig. Lower dosage levels result in a higher probability that individual pigs will not consume sufficient bacteria for successful immunization. Higher levels do not provide an appreciably greater probability of protecting all pigs in the treated groups.

The age at which the pigs are vaccinated by the method of my invention is not critical. Existing methods of vaccination are limited to pigs aged ten weeks or older. My method has no such limitation. Pigs may be vaccinated by my method at any time after they learn to drink from a waterer. Such pigs might be as young as 6 weeks old. There is no maximum age at which pigs can be vaccinated. HOwever, they should be vaccinated at an age early enough that they have not yet been exposed to jowl abscess disease.

It is not necessary to measure and present an exact amount of vaccine to each pig. The pigs to be treated are deprived of water for a short period of time in order to insure that each pig will drink readily when the vaccine is offered. An amount of vaccine sufficient to treat all the pigs is diluted with water and offered to the pigs in a trough large enough that all of them can drink at once. For example, when comparatively small pigs weighing about 25 to 50 pounds each are to be vaccinated, an adequate trough would offer at least one foot of open length per pig.

Actual concentration of the vaccine in the drinking water as offered to the swine is not critical. The volume of diluted vaccine offered to the group of swine must be large enough that each individual pig can get a sufficient dose of the vaccine. Therefore, a quantity of vaccine which contains a sufficient number of vaccine cells for the number of pigs in the group to be treated may be diluted with any convenient amount of water and placed in the vessel from which the pigs drink.

This method of vaccination against jowl abscess disease of swine is operable by merely allowing the swine to consume water in which the active vaccine is diluted. As can be easily understood by one skilled in the art, if another orally-active vaccine were also dispersed in the water, both vaccines could readily operate independently of each other. The use of a combination of vaccines is illustrated by Example 2 using jowl abscess disease vaccine in combination with swine erysipelas vaccine. The intended scope of my invention includes combined administration of jowl abscess disease vaccine and other orally-active, water-dispersible vaccines effective against diseases of swine.

EXAMPLE 1

Three groups of 10 25-pound pigs each were placed in group pens. Group one was vaccinated in the conventional manner by holding the pig's mouth open and allowing 2.0 ml. of an attenuated group E streptococcus vaccine, derived from ATCC 21223, to flow over the tonsils of the pig. Before vaccination, this group of pigs had been held without food and water for 6 hours.

Group two was vaccinated according to my method by withholding feed and water from the pigs for 6 hours and then placing 1,000 ml. of diluted live attenuated group E streptococcus vaccine, derived from ATCC 21223, containing $1.0 \times 10^8$ viable cells per ml., in a trough and allowing the 10 pigs to consume it. The same procedure was repeated 2 days later. Thus, the average dose was $1.0 \times 10^{10}$ viable cells per pig, administered twice.

Group three was not vaccinated and served as a control.

Approximately 2 weeks after groups one and two had been vaccinated, all three groups were challenged by administering a virulent jowl abscess disease culture to them in their water. Six weeks after challenge all the pigs were sacrificed and examined for jowl abscess disease.

In group one, three pigs out of 10 had abscesses.

In group two, only one pig out of eight had abscesses. Two pigs had died during the trial from causes unrelated to the experiment.

In group three, nine out of the 10 control pigs had abscesses.

EXAMPLE 2

Three groups of 12 pigs were placed in group pens. Group one was vaccinated by withholding feed and water for 6 hours and then offering the pen of twelve pigs a total of 5,000 ml. of diluted live attenuated group E streptococcus vaccine, derived from ATCC 21223, containing $3.6 \times 10^7$ viable streptococci per ml. This dose was offered in a trough of sufficient size that each pig had a chance to drink. Thus the average dose was $1.5 \times 10^{10}$ viable cells per pig.

Group two was vaccinated exactly as was group one except that the group E streptococcus vaccine was mixed with an orally administered erysipelas vaccine [described by Ose, Barnes, and Berkman, J.A.V.M.A., 143, 1084 (1963)]. The concentrations of the two vaccines in the combined liquid were adjusted so that sufficient doses of both the erysipelas vaccine and the jowl abscess vaccine were present.

Group three was not vaccinated and served as the control group.

Two weeks after vaccination all the pigs were challenged as in Example 1 by the addition of a virulent jowl abscess disease culture to their drinking water. Six weeks after challenge all of the pigs were sacrificed and examined for abscesses.

In group one only one out of eleven pigs had abscesses of the neck and jowls. One pig died from an unrelated cause during the experiment.

In group two, three pigs out of twelve had abscesses. Of these, two pigs had only one or two 0.5 cm. abscesses.

In group three, seven pigs out of eleven had abscesses. One pig out of this group died from an unrelated cause during the experiment.

The effectiveness of my method is particularly surprising in view of the prior art teaching of the need to apply the vaccine directly to the tonsils of the pig. It is highly unexpected that the diluted vaccine employed in my method would be effective merely by oral consumption by the pig.

I claim:

1. In a method for vaccinating swine against jowl abscess $\alpha$-hemolytic streptococcal lymphadenitis disease caused by a streptococcus of Lancefield's group E with a vaccine heretofore applied individually, one pig at a time, directly to the tonsils of each pig, by holding the pig's mouth open and allowing an effective dose to drip very slowly on the pig's tonsils when the pig is at least 10 weeks of age and weighs 40 pounds, and which vaccine is prepared by the attenuation of a group E streptococcus derived from exudate of cervical abscesses of swine infected with the disease, the improvement eliminating individual pig handling and inherent stress which the vaccine is added to a swine trough or waterer affording access for aqueous ingestion to a plurality of swine when filled, said plurality of the swine to be simultaneously vaccinated, after they are as young as 6 weeks old, and at said early age are comparatively small and weigh as little as 25 pounds each, have not yet been infected by virulent cultures of jowl abscess disease, have learned to drink from a waterer, and after they have been deprived of food and water for a period of time sufficient to insure that each pig will ingest readily when the vaccine in orally ingestible aqueous form is offered in said swine trough or waterer, where by said improvement a plurality of pigs two weeks after simultaneous vaccination can successfully survive challenge of jowl abscess disease culture in the drinking water, the amount of vaccine being such that each animal receives from about $10^8$ to about $10^{12}$ viable cells.

2. The method of claim 1 in which the vaccine is derived from the culture identified as ATCC 21223 wherein the organism has been attenuated by multiple passages in a medium containing acriflavine until it is avirulent.

* * * * *